Aug. 7, 1956 — W. F. GRANT — 2,757,666
CAST SPREADER
Filed Nov. 24, 1954
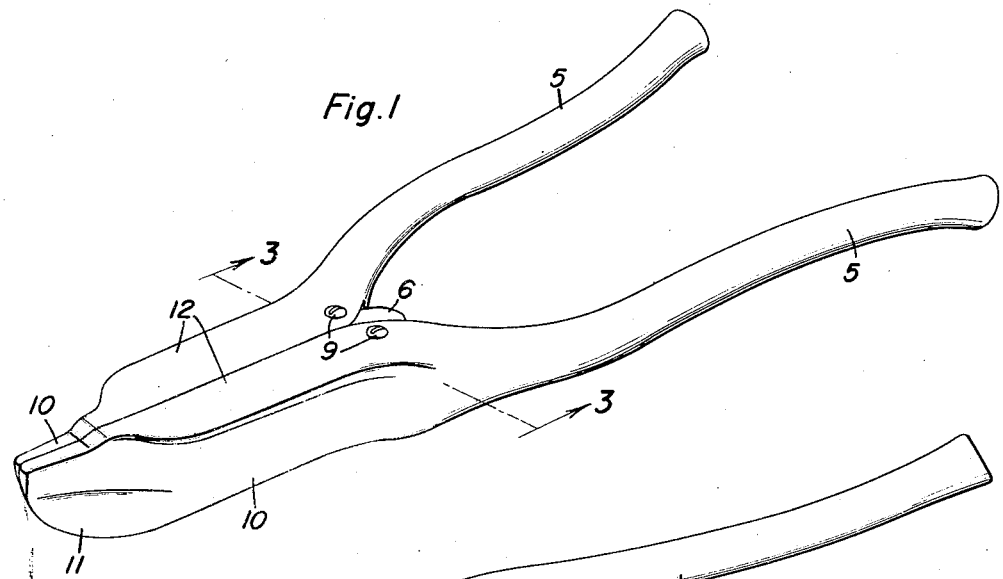
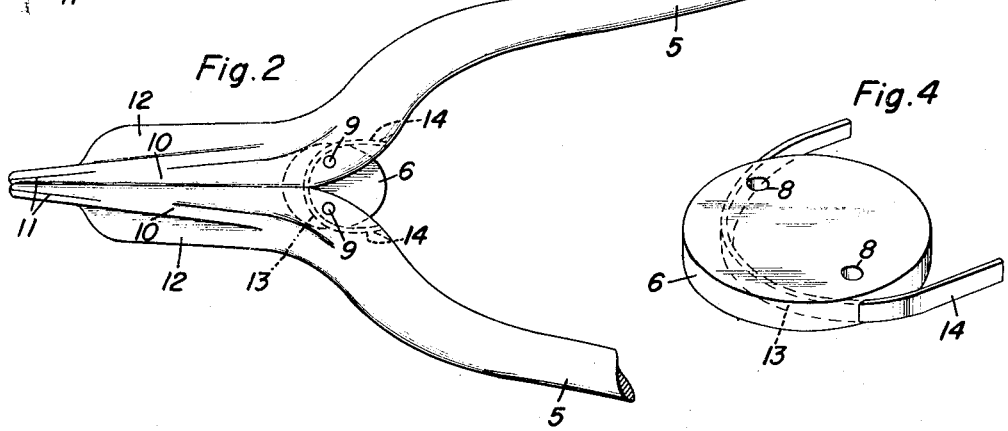
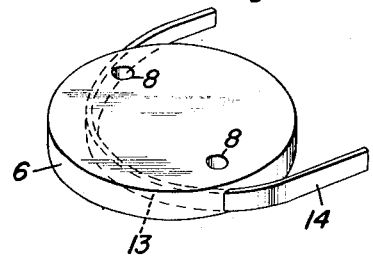
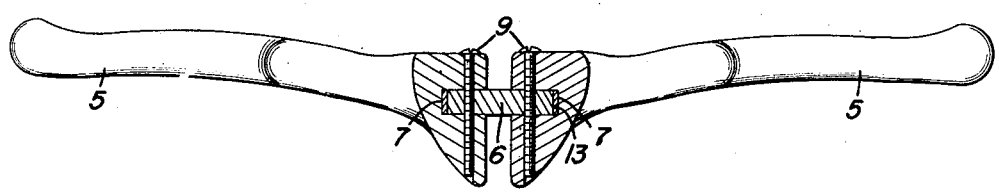
Walter F. Grant
INVENTOR.

United States Patent Office 2,757,666
Patented Aug. 7, 1956

2,757,666

CAST SPREADER

Walter F. Grant, Bellingham, Wash.

Application November 24, 1954, Serial No. 471,030

2 Claims. (Cl. 128—91)

The present invention relates to new and useful improvements in surgical instruments and has for its primary object to provide, in a manner as hereinafter set forth, novel means for expediting the process of breaking and removing plaster casts from humans and animals without pain or discomfort to the patient or animal.

Other objects of the invention are to provide a plaster cast spreader of the aforementioned character which will be simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of a plaster cast spreader embodying the present invention;

Figure 2 is a plan view of the device with one of the handles broken away;

Figures 3 is a view in transverse section, taken substantially on the line 3—3 of Figure 1; and, Figure 4 is a detail view in perspective of the jaw connecting plate and the closing spring mounted thereon.

Referring now to the drawing in detail, it will be seen that the embodiment of the invention which has been illustrated comprises a pair of forwardly convergent handles 5 of suitable material, said handles being of the shape shown. The handles 5 are pivotally connected at their forward ends by means comprising a substantially oval plate 6. Toward this end, the forward end portions of the handles 5 have formed therein opposed, longitudinally elongated recesses or channels 7 which accommodate the connecting plate 6. The plate 6 has formed in its opposite side portions openings 8 for the reception of pivot screws 9 which are inserted vertically in the forward end portions of the handles 5 and which, as shown to advantage in Figure 3 of the drawing, traverse the recesses 7.

Formed integrally with the forward ends of the handles 5 is a pair of opposed, forwardly projecting jaws 10. The free or forward end portions of the jaws 10 are formed to provide substantially segmental blades 11 for engagement in the cut or kerf which has been previously made in the cast to be removed. The jaws 10 further include, on their upper portions, lateral strengthening flanges 12 which terminate in rearwardly spaced relation to the forward ends of said jaws.

The bight portion of a substantially U-shaped leaf spring 13 is embedded in the plate 6. The legs 14 of the spring 13 are free and extend rearwardly from the plate 6 and are engaged with the side walls of the recesses 7 for yieldingly closing the jaws 10.

It is thought that the manner in which the instrument is used will be readily apparent from a consideration of the foregoing. Briefly, the kerf is made in the cast to be removed with the usual cutting tool and, with the jaws 10 in closed position in side abutting engagement with each other, the blades 11 are inserted in the kerf. Then, by closing the handles 5 the jaws 10 are opened or spread against the tension of the spring 13 for separating the adjacent parts of the plaster cast in an obvious manner. The instrument is moved forwardly in the kerf for progressively spreading the cast. Of course, as the handles 5 are released the spring 13 closes the jaws 10. After the cast has thus been spread, the physician may grasp the parts with the hands and expeditiously remove the plaster from the usual gauze.

It is believed that the many advantages of a cast spreader constructed in accordance with the present invention will be readily understood and although a preferred embodiment of the device is as illustrated and described, it is to be understood that changes in the details of construction may be resorted to which will fall within the scope of the invention as claimed.

What is claimed as new is as follows:

1. A cast spreader of the class described comprising: a pair of forwardly convergent handles having opposed recesses in the forward end portions thereof, a substantially oval plate engaged in the recesses, pins pivotally securing the handles to the plate, and a pair of opposed jaws on the forward ends of the handles, said jaws comprising free end portions including substantially segmental blades insertable in the cast.

2. A cast spreader of the character described comprising: a pair of forwardly convergent handles, said handles having opposed recesses in the forward end portions thereof, a substantially oval plate engaged in the recesses, pins pivotally securing the handles to the plate, a pair of opposed jaws integral with the forward ends of the handles and insertable in the cast, and a substantially U-shaped spring having its bight portion embedded in the plate, the legs of said spring being free of the plate and engaged under tension with the walls of the recesses for yieldingly closing the jaws.

References Cited in the file of this patent

UNITED STATES PATENTS

| | | |
|---|---|---|
| 514,799 | Wildt | Feb. 13, 1894 |
| 939,511 | Jensen | Nov. 9, 1909 |
| 2,629,276 | Means | Feb. 24, 1953 |